(12) United States Patent
Reynolds

(10) Patent No.: US 8,297,980 B2
(45) Date of Patent: Oct. 30, 2012

(54) TRAINING APPARATUS FOR CALF ROPING

(76) Inventor: William Clark Reynolds, Wright, WY (US)

( * ) Notice: Subject to any disclaimer, the term of this patent is extended or adjusted under 35 U.S.C. 154(b) by 219 days.

(21) Appl. No.: 12/800,063

(22) Filed: May 7, 2010

(65) Prior Publication Data

US 2011/0275041 A1 Nov. 10, 2011

(51) Int. Cl.
*G09B 19/00* (2006.01)
*A01K 15/02* (2006.01)

(52) U.S. Cl. ........ 434/225; 273/336; 273/338; 273/339; 273/359; 273/367; 273/370; 280/1.204; 446/371; 434/219; 472/97; 119/712; 119/839

(58) Field of Classification Search ............... 273/336, 273/338, 339, 359, 367, 370; 280/1.204; 446/371; 472/97; 119/839; 434/247, 225
See application file for complete search history.

(56) References Cited

U.S. PATENT DOCUMENTS

| | | | | |
|---|---|---|---|---|
| 1,421,046 | A * | 6/1922 | Walsburger | 280/1.204 |
| 2,819,900 | A | 1/1958 | Brackett | 273/1 |
| 2,846,810 | A * | 8/1958 | Ory | 434/225 |
| 3,309,791 | A * | 3/1967 | Kelley et al. | 434/225 |
| 3,324,832 | A | 6/1967 | McCain | 119/29 |
| 3,406,969 | A | 10/1968 | Tisdell | 273/1 |
| 3,711,098 | A * | 1/1973 | McCord | 273/336 |
| 3,716,941 | A * | 2/1973 | Dowden et al. | 434/225 |
| 3,776,553 | A * | 12/1973 | Kelton | 273/339 |
| 3,974,799 | A | 8/1976 | Parsons | 273/105.2 |
| 4,136,874 | A | 1/1979 | McCord | 273/105.2 |
| 4,203,233 | A | 5/1980 | Crane | 35/29 |
| 4,266,779 | A * | 5/1981 | English | 119/839 |
| 4,286,788 | A * | 9/1981 | Simington et al. | 273/359 |
| 4,451,045 | A * | 5/1984 | Fesmire | 273/338 |
| 4,498,676 | A | 2/1985 | Runner | 273/336 |
| 4,640,515 | A * | 2/1987 | Rhine | 273/339 |
| 4,874,179 | A * | 10/1989 | Henderson | 273/338 |
| 4,960,076 | A * | 10/1990 | Snorgrass et al. | 119/839 |
| 4,981,302 | A * | 1/1991 | Narramore | 273/339 |
| 4,995,618 | A * | 2/1991 | Panzner | 273/367 |
| 5,009,432 | A * | 4/1991 | Richard | 273/339 |
| 5,080,373 | A * | 1/1992 | Jones | 273/338 |
| 5,255,629 | A * | 10/1993 | Paterson | 119/839 |
| 5,709,386 | A * | 1/1998 | Nelson | 273/370 |
| 5,775,698 | A * | 7/1998 | Jones et al. | 273/359 |
| 6,629,695 | B2 | 10/2003 | Tisdell | 273/359 |
| 6,736,399 | B1 * | 5/2004 | Copenhaver | 273/339 |
| 7,293,775 | B1 * | 11/2007 | Donnelly | 273/359 |
| 2003/0034613 | A1 | 2/2003 | Tisdell | 273/359 |
| 2004/0101811 | A1 | 5/2004 | Gipson | 434/247 |
| 2006/0170163 | A1 * | 8/2006 | Perkins | 273/359 |
| 2007/0017456 | A1 * | 1/2007 | Huett | 119/839 |
| 2007/0026763 | A1 * | 2/2007 | Panec et al. | 446/371 |
| 2010/0105493 | A1 * | 4/2010 | Tirelli | 472/97 |
| 2011/0111379 | A1 * | 5/2011 | Ashley | 434/225 |

* cited by examiner

*Primary Examiner* — Nikolai A. Gishnock
*Assistant Examiner* — Randall N Crenwelge
(74) *Attorney, Agent, or Firm* — J. David Nelson

(57) ABSTRACT

A calf roping training apparatus incorporating a simulated calf, a support column and a towing structure. The support column has a spin joint and an invert joint. The calf body of the simulated calf is formed by one or more pieces of simulated skin and a simulated head fixed in anatomical form by a body frame. The support column is anchored to the towing structure. The towing structure has a tow member, a pair of long skids, a short skid, and a towing attachment device. The support column base is attached to the short skid which provides for transfer of the weight of the simulated calf to the ground. The support column top is attached to or integrated with the body frame.

14 Claims, 14 Drawing Sheets

TRAINING APPARATUS FOR CALF ROPING

BACKGROUND OF THE INVENTION

Calf roping is a very popular rodeo event which developed from a skill that was needed for cattle ranching in this country and many others. The popularity of calf roping, both for the participants and for the spectators, is probably attributable to a number of factors. Calf roping requires the use of a highly trained horse and requires the roper and the horse to work as a finely coordinated team. Roping skills are also paramount for the roper. Also, while the roper must be agile and reasonably strong to be a serious competitor in this event, the event does allow participants of varying physiques and ages to participate, unlike a number of the other rodeo events which highly favor participants of a particular physique and a younger age.

The principal difficulty that many calf roping participants face in regard to developing and improving their skills is how to get the sufficient practice repetitions. Practice ordinarily includes the use of the roper's horse that would be used in the rodeo event, since horse training and team coordination of roper and horse are paramount. Further, the roper's horse will usually be readily available to the roper for practice. The same is not true of the target animals, the calves. The calves used for this rodeo event are usually in the range of 200 to 300 pounds. In order to be an effective competitor, a roper must engage in substantial repetitive practice. Most professional calf ropers can complete the roping and tying of a calf in approximately seven seconds, and the current world record is approximately six seconds. Unless there are a large number of calves in this weight range available for practice, or animals are used repetitively in an inhumane manner, i.e., excessive numbers of repetitions, adequate live animal practice is beyond the reach of most competitors.

Because of the interest in this rodeo event, and the very limited availability of live practice animals to the average participant, a number of calf roping training devices have been developed with the goal in mind of allowing a participant to improve his or her calf roping skills without the use of live animals. Unfortunately there has not been a suitable apparatus developed to provide for realistic simulation of all of the aspects of the calf roping event.

For the event, a target calf is released, at a signal from the roper, from a chute which is located to the right of a pen or "box" where the roper sits mounted on her or his horse. The horse is restrained by a rope across the front of the box which is attached to a trip lever. The calf has a lightweight rope, usually twenty eight (28) feet long around its neck which is attached to the trip lever. As the calf runs away from the chute it gets to the end of the lightweight rope which causes a tug on the rope, causing the rope to fall off the calf and tripping the trip lever. The trip lever starts the timer and drops the rope across the front of the box, thereby releasing the horse and the roper to pursue the calf, which has a head start.

Typically the target calf will run directly away from the chute and the pursuing roper. The horse and roper will close on the target calf and the roper will throw the larriot lasso at the appropriate time with the intent to lasso the head of the calf. Generally all ropers rope with their right arm and hand, even left hand dominant ropers. The preferred roping technique will result in the slip knot or "hondo" as it is called, which forms the lasso, ending up on the left side of the calf's neck. After the slack is pulled from the loop, the roper can place the hondo on the left or right side of the calf's neck by pitching the remainder of slack forward toward the calf either on the left or right side of the calf. Then the horse, on signal from the roper, begins the process of stopping and the roper begins the process of transitioning from the saddle to the ground. The forward momentum of the calve and the force of the rope cause the calf to rotate, usually to the left. The preferred position of the hondo on the left side of the neck of the target calf, assists in causing the calf to rotate to the left as the horse stops and actually begins to back up to retain tension in the rope.

As the dismounted roper approaches the calf, the calf is now facing the roper with the hondo still on the left side of the target calf's neck, which is nearer the roper as the roper approaches the calf from the front of the calf, slightly offset to the calf's left. The roper grabs the rope near the hondo with his left hand as he "blocks" the calf by pressing his knee against the breast of the calf which is kept facing him by the constant tension from the rope as the horse backs away as needed to keep tension on the rope. With her or his left hand on the hondo, the roper shifts to the left side of the calf and grabs the right rear flank of the calf. The roper then raises the front of the calf, lifts the calf off its feet slightly, rotates the calf laterally approximately ninety degrees (90°) thereby extending the target calf's legs away from the roper, and lowers the calf to the ground. The roper then grabs the right front leg and then the two hind legs a few inches above the hooves, ties these three legs together with a short rope called a "piggin string", and raises his or her arms to signify completion, stopping the timer. The horse then backs off on the tension, and the calf is observed, usually for six seconds, to see if the calf's legs stay bound. If so, the roper will have completed a valid task and her or his score will be based upon the time from the tripping of the lever to the raising of her or his arms signaling completion.

In order to provide a realistic simulation of the calf roping experience an apparatus must provide for the following:

1. Allows the use of the roper's horse for repetitive training.
2. Simulates pursuit, roping, and post roping conditions for the horse.
3. Simulates pursuit, roping, calf handling, and leg tying conditions for the roper.
4. Simulates calf turning motion and resistive forces.
5. Simulates calf body size, shape, weight, and resiliency.
6. Simulates the motion and forces required for the roper to lift and invert a calf.
7. Simulates the movement and forces required by the roper to tie the two hind legs and the right front leg together.

All of the foregoing are needed in order to realistically simulate the calf roping experience and provide the type of simulated training experience that will be useful to a serious competitor and truly enjoyable for the mere recreational roper.

It is therefor an objective of the present invention to provide a simulated target calf for use in calf roping training that can be towed or otherwise motivated by a truck, SUV, ATV or other motorized vehicle and provide for simulation of the calf roping experience from start to finish.

It is a further objective of the present invention to provide a simulated target calf that will simulate calf running speed, roping target presentation, turning mechanics and forces, calf body inverting mechanics and forces, leg tying mechanics and forces, and calf body size, form, resiliency and weight.

It is a still further objective of the present invention to provide a simulated target calf for calf roping training with a support structure accommodating the motivation of the target calf at a simulated speed, the support structure having a pivoting joint and an inversion joint, providing for the turning of the target calf from a run away position to a facing position with the force of the rope applied by the horse after the calf is roped by the roper, and providing for the lifting and lateral rotation of the target calf as the target calf is inverted for the final leg tying task of the roper.

SUMMARY OF THE INVENTION

A preferred embodiment of the calf roping training apparatus of the present invention comprises a simulated calf, a support column and a towing structure. The support column incorporates two of the key features of the present invention, referred to in this application as the spin joint and the invert joint. The calf body of the simulated calf is formed by one or more pieces of simulated skin and a simulated head fixed in anatomical form by a body frame. The support column is anchored to the tow member end of the tow member of the towing structure. The support column base is attached to a short skid which provides for transfer of the weight of the simulated calf to the ground. The support column extends upwardly from the short skid. The support column top is attached to or integrated with the body frame. The connection of the support column to the towing structure maintains the vertical orientation of the support structure axis as the simulated calf spins from the forward configuration to the rearward configuration. The towing structure has a tow member, a pair of long skids, a short skid, and a towing attachment device. The tow member may be attached to a towing device such as an ATV by the towing attachment device.

The spin joint has a spin shaft, spin sleeve with spin track, and spin ramp of the spin joint. The spin ramp is in a round tubular form affixed to or integrated with the spin shaft which is also a round tube or solid shaft. The spin shaft and the spin ramp are fixed in position, being anchored to the tow member and attached to the short skid, and do not spin with the simulated calf. The spin sleeve is also in a round tubular form and is affixed to the invert receiver. The inside diameter of the spin sleeve is slightly larger than the outside diameter of the spin shaft so that the spin sleeve can rotate freely on the spin shaft as the simulated calf is spun from the forward configuration to the rearward configuration.

When the simulated calf body is rotated to the rearward configuration and the spin sleeve and the spin track of the spin joint are in a track lowered configuration, the track contact surface is in more or less full contact with the ramp contact surface and the spin joint is now in the spin joint lowered configuration. The raised calf body configuration, which is the configuration of the calf body as the simulated calf is roped by the roper, provides for the simulated legs of the calf to clear the tow member, transverse skid members and the skids as the calf rotates from the forward configuration to the rearward configuration. The calf body is lowered from the raised configuration to the lowered configuration as it spins from the forward configuration to the rearward configuration but maintains clearance for the legs as it spins over the tow member, the skid cross members, and the skids to clear those items before finally being lowered to the lowered configuration. The raised configuration of the simulated calf body is fine for roping of the calf by the roper, but the calf needs to be in the lowered position with the calf body the correct distance above the ground as the roper approaches, blocks, grasps and inverts the calf.

A hind leg joint assembly incorporates an anchor sleeve, an upper hind leg pivot joint, and a lower hind leg pivot joint. The hind leg joint assemblies provide for attaching the hind legs to the body frame in respective hind leg anatomical positions. The hind leg anchor sleeves allow the lateral movement of the hind legs as the hind leg anchor sleeves slide laterally upon the hind leg anchor member. The anchor sleeves also provide for the forward and backward rotation of the hind legs. Each simulated hind leg may be threaded onto the hind leg assembly. The combination of the lateral rotation allowed by the hind leg pivot joints and the lateral movement and backward and forward rotation allowed by the hind leg anchor sleeves, and the resistive force imposed by the leg springs simulate the anatomical movement of the legs that is desirable to simulate the leg handling required for the leg tying task that must be accomplished by the roper after the calf is inverted.

A structure and leg assembly substantially identical to that used for the hind legs may be used for preferred embodiments of the front legs. The front leg joint assemblies attach the front legs to the body frame in respective front leg anatomical positions. Alternatively, since only one of the front legs is involved in the leg tying task which completes the calf roping event, the left front leg may be omitted or a rigid left front leg may be affixed to the body frame. A pair of hind leg springs and a right front leg spring maintain the simulated calf legs in a neutral position as the calf is being roped, spun, and inverted, and provide the needed simulated resistive force as the right front leg and the two hind legs are pulled together by the roper for the final leg tying task.

The invert joint has an invert insert and an invert receiver. The invert insert has an insert collar, the horizontal cross-section dimensions of the insert collar being only slightly smaller than the corresponding internal dimensions of the invert receiver thereby providing for the invert insert to remain locked with the invert receiver as the calf body is spun from the forward configuration to the rearward configuration. If, however, the calf is roped incorrectly or the calf is orientated directly away from the force of the rope, and as a result the calf is jerked directly rearward and therefore comes over backwards rather than being spun to the left or the right, the limited depth of the insert collar and the insert gap between the invert insert and the invert receiver will allow the separation of the invert insert and the invert receiver in this scenario and allow the calf body to rotate directly up and backwards thereby allowing a natural result from an incorrect roping effort by the roper or an unfortunate orientation of the calf.

If the calf is rotated from the forward configuration to the rearward configuration successfully as a result of a proper execution of the roping task by the roper and the roper approaches the calf on foot, grasping the hondo with his left hand and the calf's right hind flank with his right hand and lifts the calf as would be required to lift a live calf off its feet, the invert insert is lifted in the invert receiver above the insert crown, and the insert front tapered zone then allows for the front of the calf to be rotated up somewhat and the insert right tapered zone allows for the invert insert to separate from the invert receiver and for the right side of the calf to rotated up approximately ninety (90) degrees so that the legs of the calf are extended more or less horizontally away from the roper, all for a motion correct inversion of the calf. The lifting and inverting of the simulated calf body can therefore be accomplished in a naturally simulated fashion, allowing the roper to lower the calf to the ground with the legs oriented away from the roper. The tying of the legs can then likewise be accomplished in a naturally simulated fashion, finishing the roping, inversion, and leg tying tasks of the calf roping event.

The simulated calf has a layer of simulated skin and a simulated head defining the exterior of the simulated calf body. The simulated calf body may also have an internal ballast cavity membrane which may enclose and support an optional ballast bladder. The ballast cavity membrane will preferably be a resilient membrane that provides for the inflation and deflation of the ballast bladder. The ballast bladder may be inflated with air, adding bulk to the simulated calf body, or may be inflated or partially inflated with water, adding weight to the simulated calf.

An orientation assembly providing for the simulated calf to be oriented to the left or the right, thereby providing a variation in the orientation of the simulated calf as the simulated calf is towed for roping practice.

DETAILED DESCRIPTION

Figure 1:
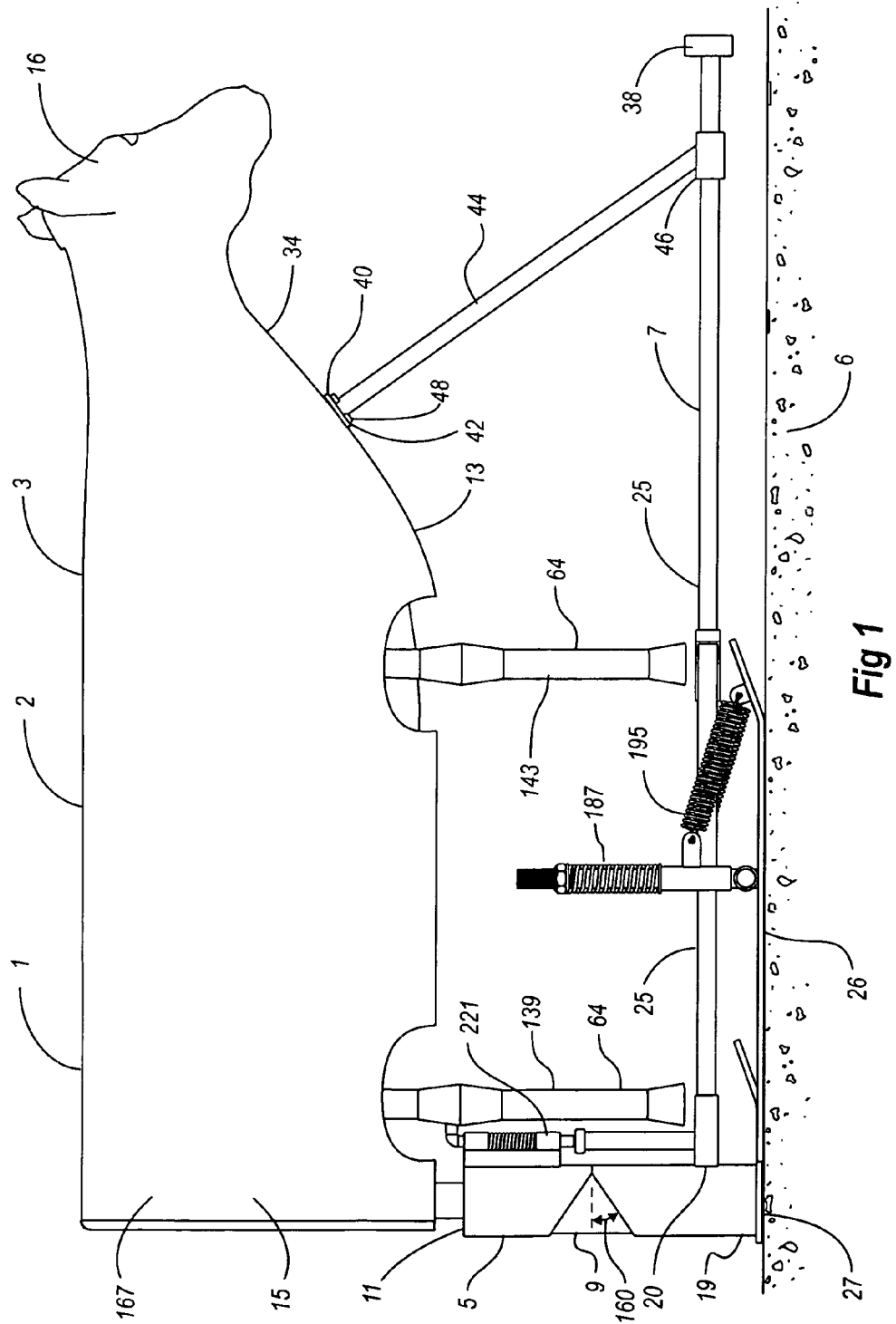
FIG. 1 is a right side elevation view of the calf roping training apparatus of the present invention in a forward orientation.
Figure 5:
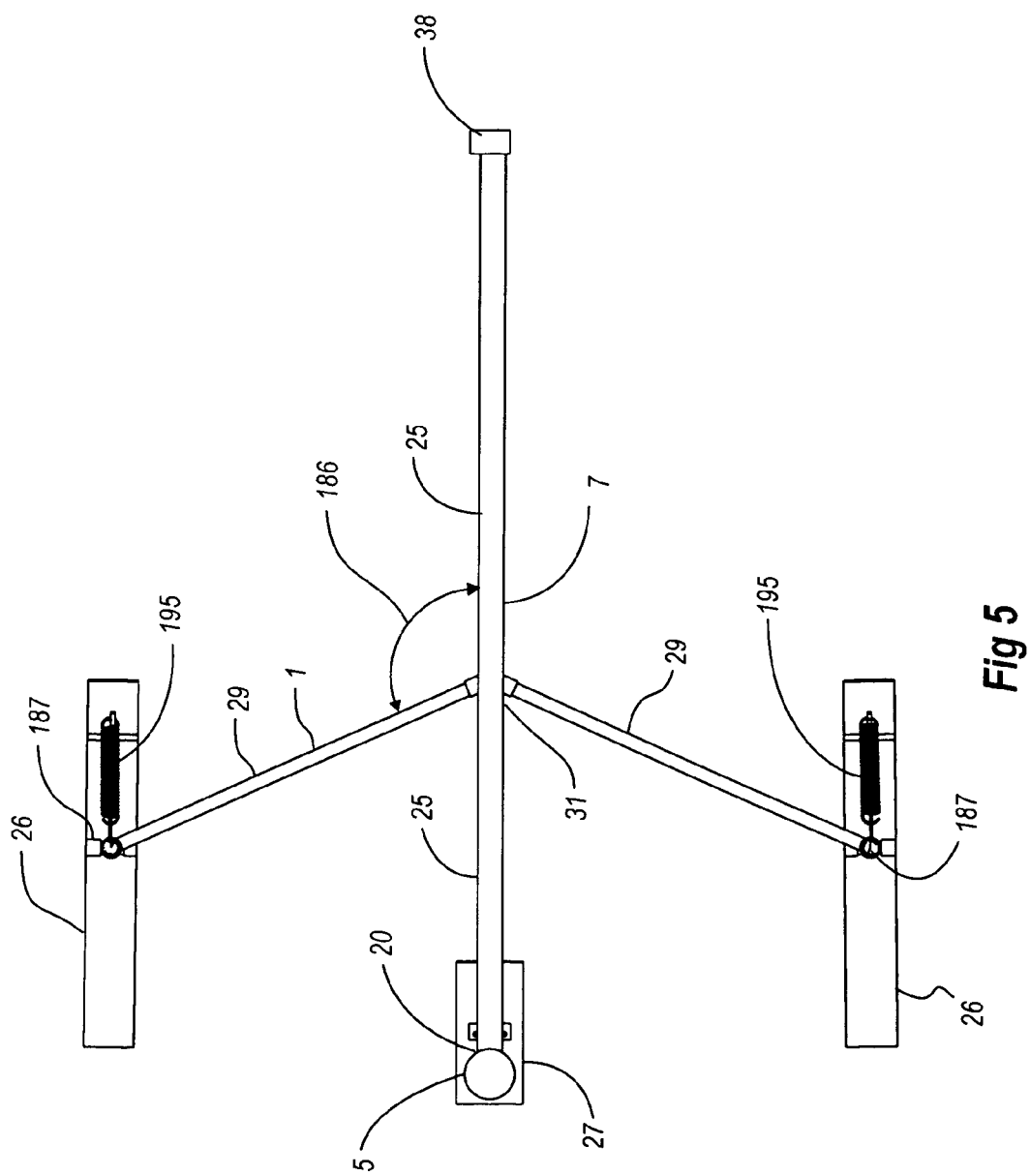
FIG. 5 is a plan view of the support structure of the calf roping training apparatus of the present invention in a forward orientation.
Figure 6:
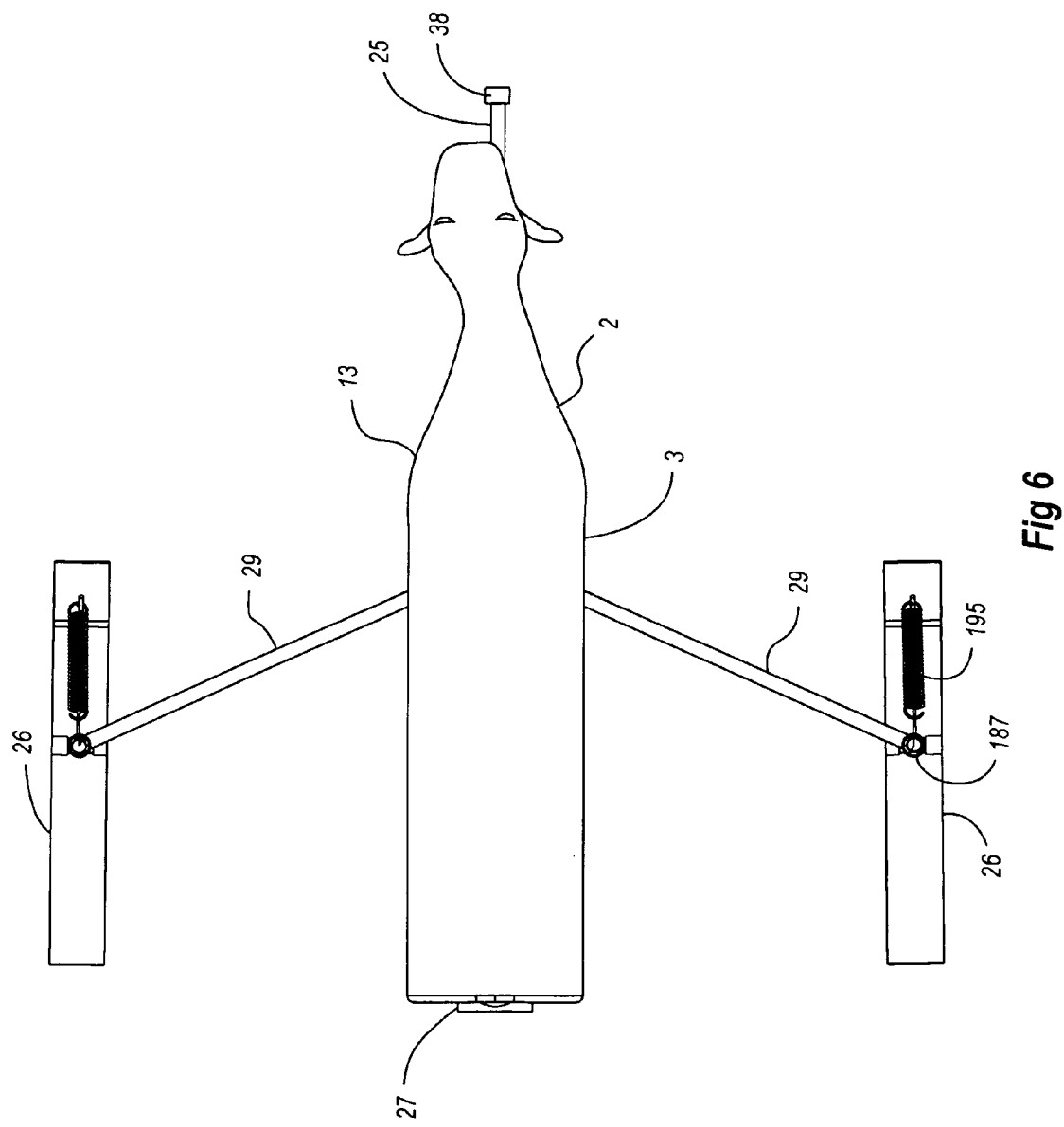
FIG. 6 is a plan view of the calf roping training apparatus of the present invention in a forward orientation.
Figure 7:
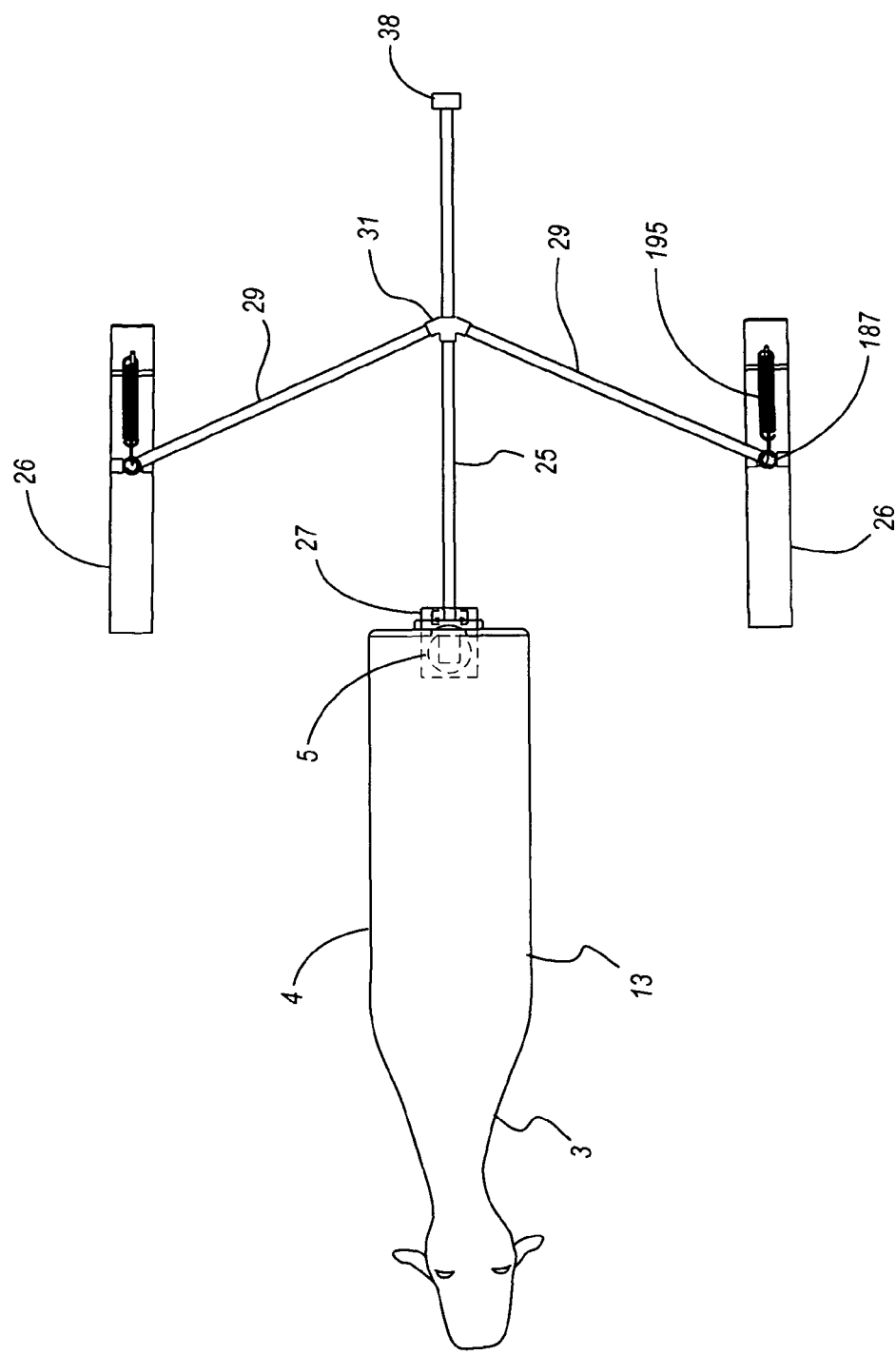
FIG. 7 is a plan view of the calf roping training apparatus of the present invention in a rearward orientation.
Figure 8:
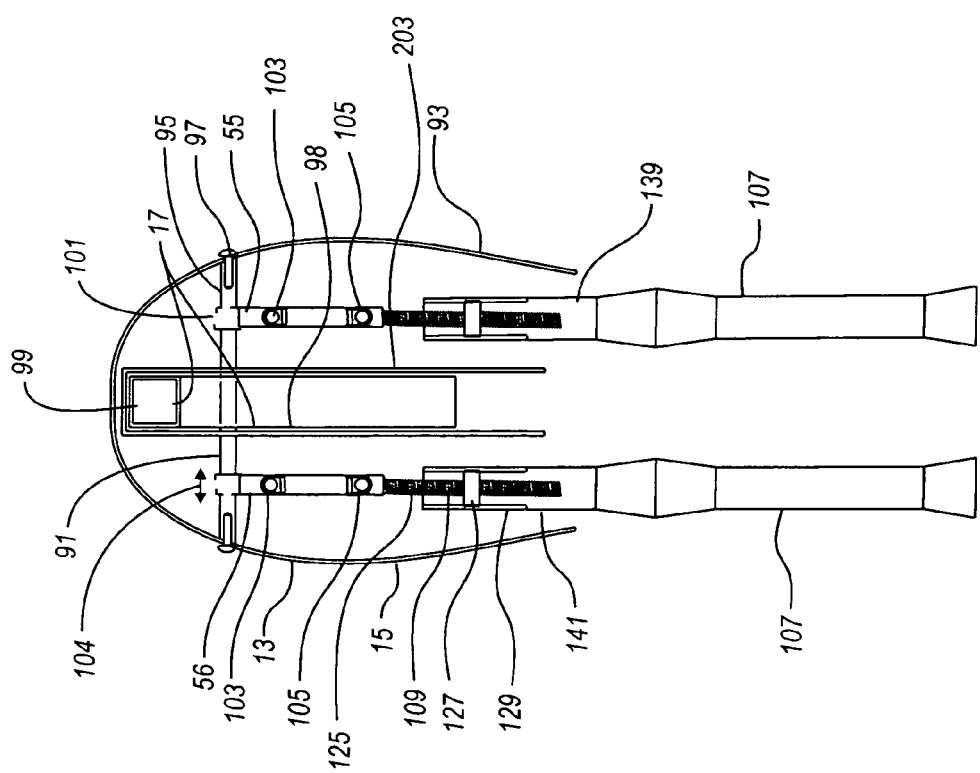
FIG. 8 is a rear view, vertical cross-section of the simulated calf body, body frame, and hind leg assemblies of the calf roping training apparatus of the present invention.
Figure 10:
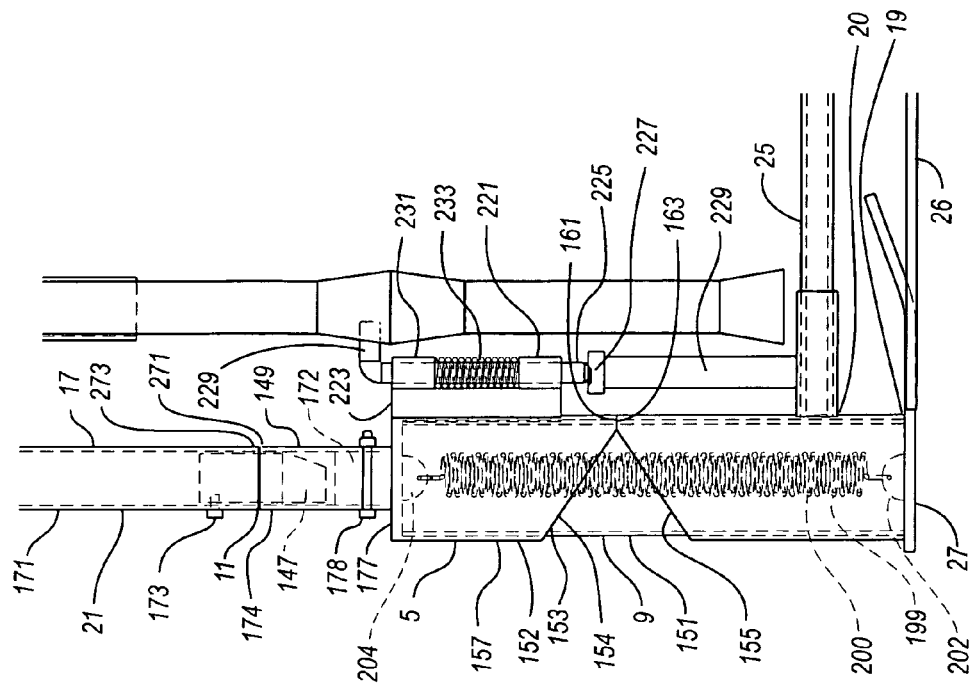
FIG. 10 is a right side, vertical cross-section detail support column, spin joint, invert joint, and orientation selector of the calf roping training apparatus of the present invention.

Referring first to FIG. 1 a preferred embodiment of the calf roping training apparatus 1 of the present invention in a forward configuration 2 is shown. The preferred embodiment shown comprises a simulated calf 3, a support column 5 and a towing structure 7. The support column incorporates two of the key features of the present invention, referred to in this application as the spin joint 9 and the invert joint 11. Referring also to FIG. 8, the calf body 13 of the simulated calf 3 is formed by one or more pieces of simulated skin 15 and a simulated head 16 fixed in anatomical form by a body frame 171. Referring also to FIG. 5 and FIG. 10, the support column 5 is anchored to the tow member end 20 of the tow member 25 of the towing structure 7. The support column base 19 is attached to a short skid 27 which provides for transfer of the weight of the simulated calf 3 to the ground 6. The support column extends upwardly from the short skid. Referring also to FIG. 3, the support column top 21 is attached to or integrated with the body frame 17. The connection of the support column to the towing structure maintains the vertical orientation 30 of the support structure axis 32 as the simulated calf 3 spins from the forward configuration 2 as shown in FIG. 1 and FIG. 6 to the rearward configuration 4 shown in FIG. 2 and FIG. 7.

Referring again to FIG. 5, for the embodiment of the calf roping training apparatus 1 shown in FIG. 1, the towing structure has a tow member 25, a pair of long skids 26, a short skid 27, a towing attachment device 38, and a stability member 44, as shown in FIG. 1. Other embodiments may not have the stability member 44. Each of the long skids is attached to the tow member 25 by a transverse skid member 29. For the embodiment shown, the transverse skid members are attached to the tow member by a tow member connector 31. For the embodiment shown, the tow member extends past the tow member connector and the support column 5 is attached to and stabilized by the tow member end 20.

Referring again to FIG. 1, the tow member 25 is attached to a towing device, such as an ATV, by the towing attachment device 38. The inventor prefers the use of a rope tow with the towing attachment device attached by a rope to a rope friction type towing anchor device 267, such as that shown in FIG. 20. The towing anchor device 267 may be attached to the towing device by a standard hitch insert tube 261 or by other means known to persons of ordinary skill in the art. The towing anchor device 267 shown in FIG. 20 allows the towing device operator to hold the free end 265 of a tow rope 268 in her or his hand and feel the tension in the tow rope used to secure the calf roping training apparatus to the towing device and to tow the calf roping training apparatus behind the towing device. The towing end 263 of the tow rope is attache to the tow attachment device 38 If the force on the tow rope 268 becomes unexpectedly high, the operator may just release the free end 265 of the tow rope, thereby allowing the calf roping training device to skid to a stop. The rope friction device prevents the impact force exerted by the lasso rope on the simulated calf and the simulated calf on the roper's horse from exceeding a desired maximum. A mechanical or magnetic hitch assembly or other towing attachment devices and towing anchor devices known to persons skilled in the art may be used to attach the towing structure of the calf roping training apparatus to a towing device for towing.

The simulated calf 3 is positioned in a forward configuration 2 in FIG. 1, which is the configuration that the simulated calf will be in as the calf roping training apparatus 1 is being towed for a practice roping event. The simulated calf 3 is in a rearward configuration 4 in FIG. 2, which is the configuration that the calf will be in after being roped and spun by the force of the rope thrown by the roper over the head and around the neck of the simulated calf. When the simulated calf 3 is in the forward configuration, an optional stability member 44, which may be attached to the tow member 25 by direct weld or by a stability member connector 46, may extend to contact the calf chest 34 in a stability contact zone 40 which is supported from the inside of the simulated calf by the sternum plate 36 which is shown in FIG. 3. The stability member tip 48 will preferably have a padded or resilient contact surface 42. The optional stability member 44 reduces vertical and lateral jostling of the simulated calf body as the calf roping training apparatus is towed by the towing device, thereby reducing the impact loading on the support column. The stability member 44 also prevents a lesser skilled roper from roping the simulated calf too deep and roping the entire simulated calf rather than just the neck.

Referring again to FIG. 3 a right side cutaway view of the simulated calf body 13 in the forward configuration 2 is shown. This figure shows the simulated right hind leg 139, right front leg 143, right hind leg joint assembly 55, right front leg joint assembly 57, calf body frame 17, support column 5, spin joint 9, invert joint 11, and the tow member 25, for this embodiment. Referring also to FIG. 10, the invert insert 147 and invert receiver 149 of the invert joint 11, and the spin shaft 151, spin sleeve 152 with spin track 153, and spin ramp 155 of the spin joint 9 are shown. The spin joint is in the raised configuration 157 in FIG. 3 and FIG. 10 and the spin track 153 is in the track raised position 154. Referring to FIG. 10, to provide for stability against an unintended spin of the calf body as the calf roping training apparatus is being towed, the spin track may have a flattened track tip 161 and the spin ramp may have a similarly flattened ramp seat 163 which provide for the track tip to be in contact with the ramp seat when the calf body 3 is in the forward configuration 2 and the spin joint is in the raised configuration 157. The spin ramp 155 is in a round tubular form affixed to or integrated with the spin shaft 151 which is a round tube or solid shaft. The spin shaft and the spin ramp are fixed in position, being anchored to the tow member 25 and attached to the short skid 27, and do not spin with the simulated calf. The spin sleeve 152 is also in a round tubular form and is affixed to the invert receiver 149. The inside diameter of the spin sleeve is slightly larger than the outside diameter of the spin shaft 151 so that the spin sleeve can rotate freely on the spin shaft 151 as the simulated calf 3 is spun from the forward configuration 2 to the rearward configuration 4.

Figure 2:
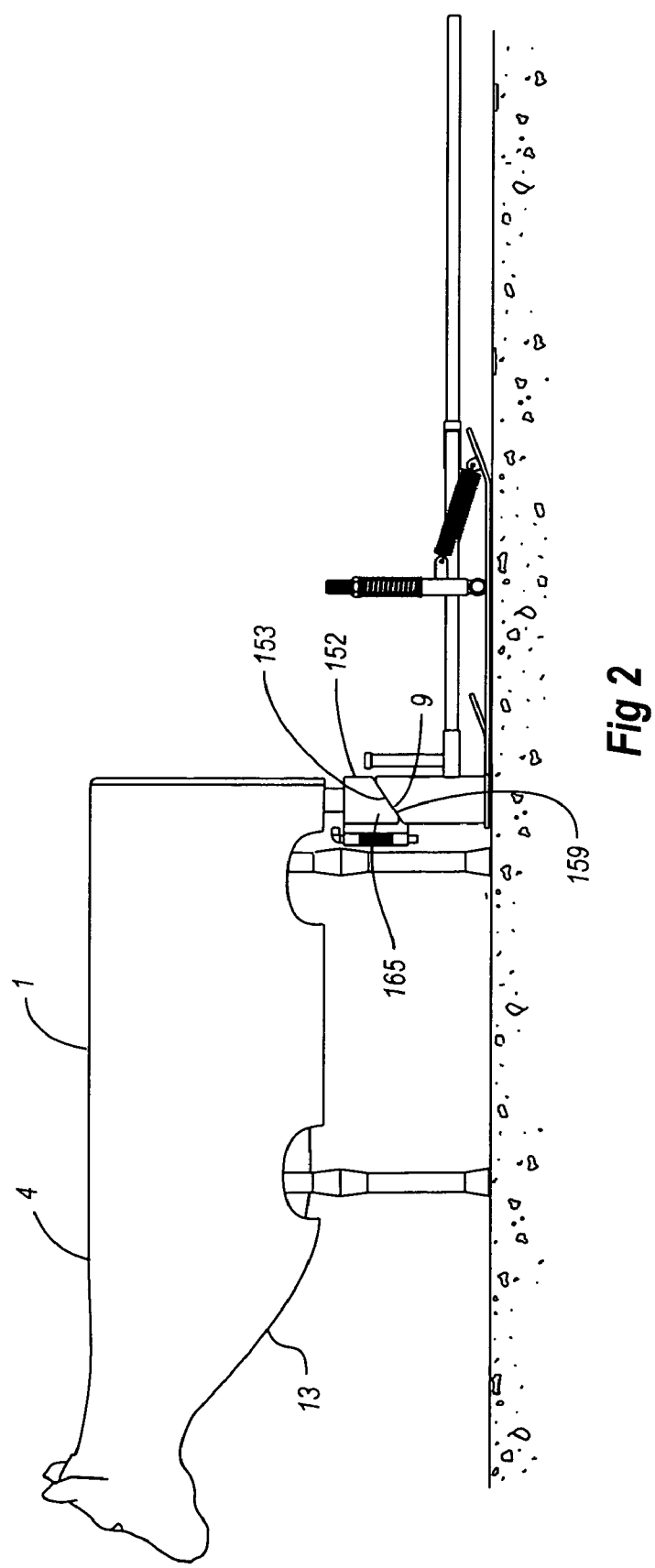
FIG. 2 is a left side elevation view of the calf roping training apparatus of the present intention in a rearward orientation.
Figure 3:
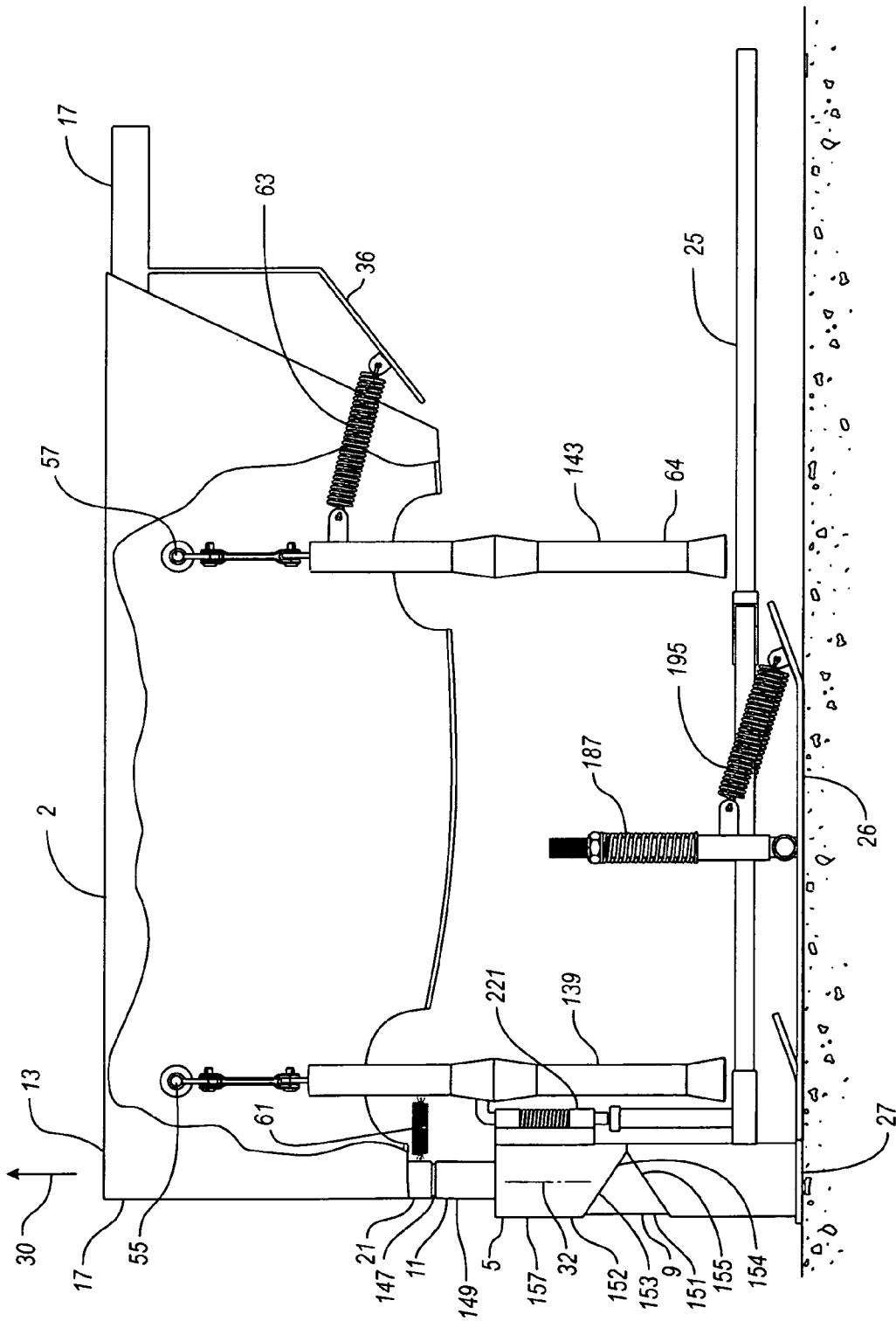
FIG. 3 is a right side cut-away elevation view of the calf roping training apparatus of the present invention in a forward orientation.
Figure 4:
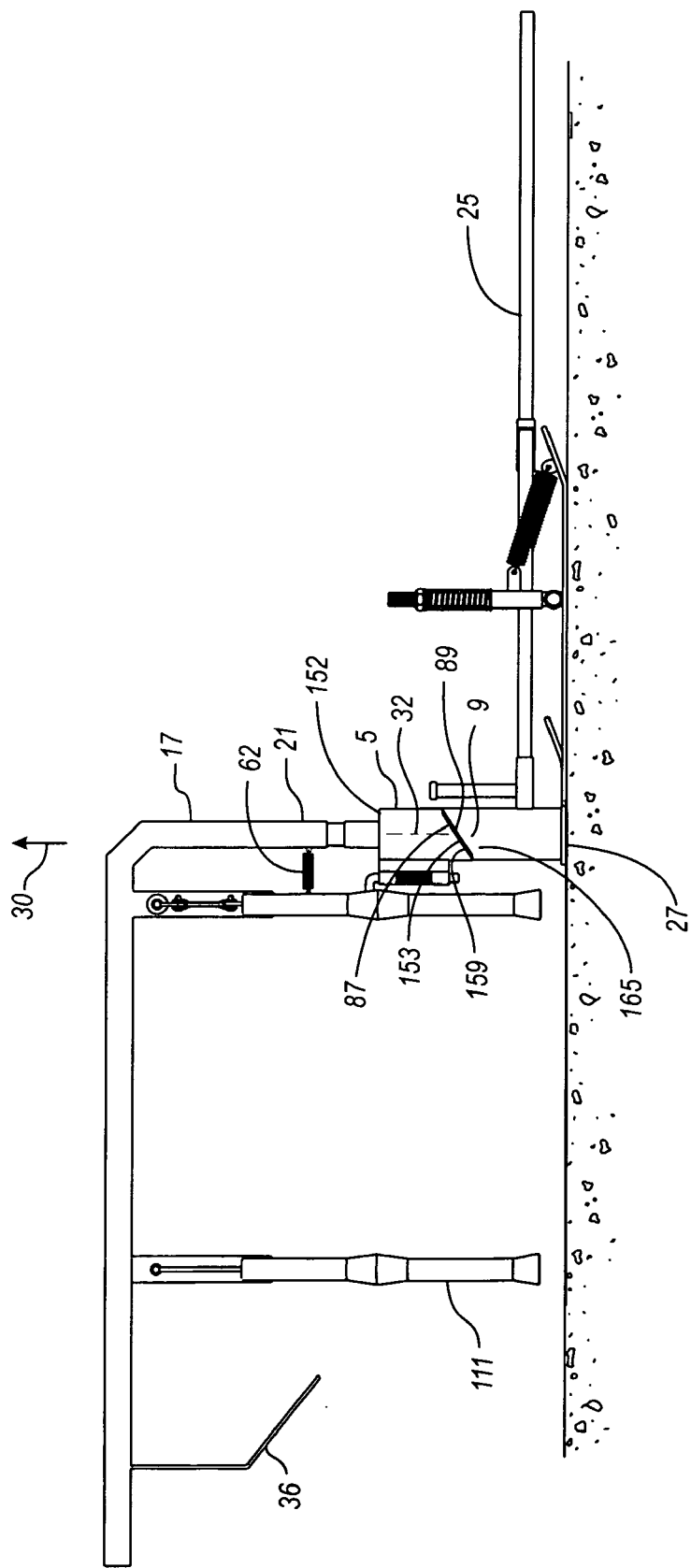
FIG. 4 is a left side cut-away elevation view of the calf roping training apparatus of the present invention in a rearward orientation.

Referring now to FIG. 2 and FIG. 4, the simulated calf body 13 is rotated to the rearward configuration 4 and the spin sleeve 152 and the spin track 153 of the spin joint 9 are in a track lowered configuration 159. In this configuration, the track contact surface 87 is in more or less full contact with the ramp contact surface 89 and the spin joint 9 is now in the spin joint lowered configuration 165. The raised calf body configuration 167 as shown in FIG. 1, which is the configuration of the calf body as the simulated calf is roped by the roper, provides for the simulated legs of the calf to clear the tow member, transverse skid members and the skids as the calf rotates from the forward configuration 2 to the rearward configuration 4. The calf body is lowered from the raised configuration 167 to the lowered configuration 165 as it spins from the forward configuration to the rearward configuration but maintains clearance for the legs as it spins over the tow member, the skid cross members, and the skids to clear those items before finally being lowered to the lowered configuration. Referring to FIG. 1, the spin ramp slope 160 may vary, which will vary the ease and speed of the spinning of the simulated calf from the forward configuration 2 to the rearward configuration 4. Also, while the inventor prefers that the support column be attached to or integrated with the body frame at the rear of the simulated calf body as shown in FIG. 1, the support column may be attached to or integrated with the body frame at a position forward of the rear of the simulated calf body.

The raised configuration 167 of the simulated calf body 13 is fine for roping of the calf by the roper, but the calf preferably needs to be in the lowered position 165 with the calf body the correct distance above the ground as the roper approaches, blocks, grasps and inverts the calf. However, while the lowered configuration with legs near the ground are preferable, simplified embodiments may incorporate a horizontal spin ramp and spin track.

Figure 9:
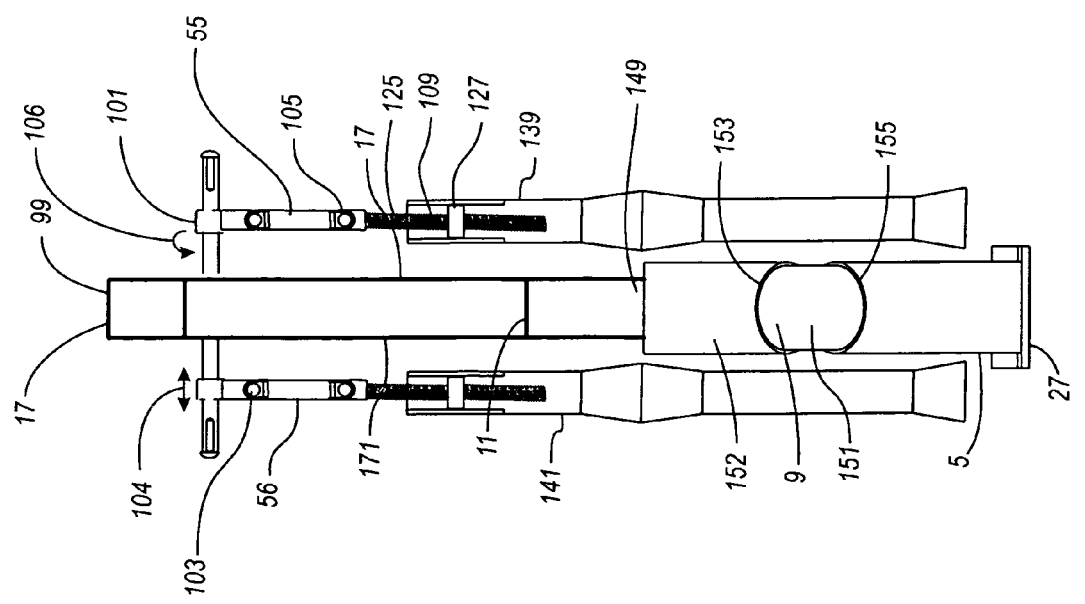
FIG. 9 is a rear view, vertical detail of the simulated calf body, body frame, and hind leg assemblies of the calf roping training apparatus of the present invention.
Figure 11:
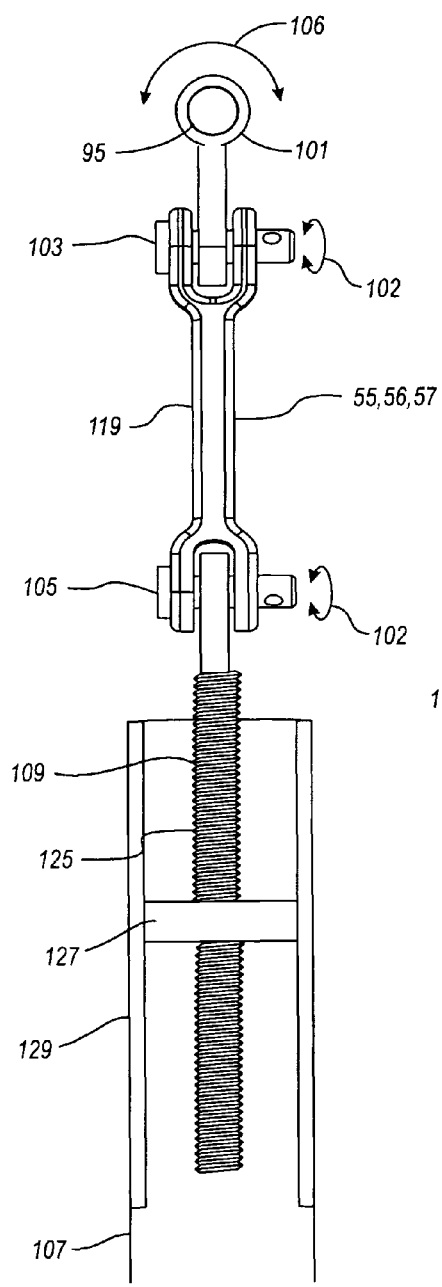
FIG. 11 is a vertical detail of a leg assembly of the calf roping training apparatus of the present invention.

Referring again to FIG. 8, a rear view, vertical cross section of the calf body 13 showing the calf body frame 17 and the hind leg structure 91, including the left hind leg 141, the right hind leg 139, left hind leg joint assembly 56, and right hind leg joint assembly 55, is illustrated. The resilient calf body shell 93 is attached to the hind leg anchor member 95 by body shell fasteners 97. The hind leg anchor member is anchored to the main body frame member 99 of the calf body frame 17 by attachment to a vertical frame member 98. Referring also to FIG. 11, a detail of a preferred embodiment of a hind leg assembly, i.e. the left hind leg joint assembly 56 or the right hind leg joint assembly 55, is shown. The hind leg joint assemblies attach the hind legs to the body frame in respective hind leg anatomical positions. The hind leg joint assembly incorporates an anchor sleeve 101, an upper hind leg pivot joint 103, and a lower hind leg pivot joint 105. Referring also to FIG. 9, the hind leg anchor sleeves 101 allow the lateral movement 104 of the hind legs as the hind leg anchor sleeves 101 slide laterally 104 upon the hind leg anchor member 95. The anchor sleeves 101 also provide for the forward and backward rotation 106 of the hind legs. Each simulated hind leg 107 may be attached to the hind leg joint assembly by a hind leg anchor element 109 which may provide for the hind legs to be threaded onto the hind leg assembly as shown in FIG. 11. The combination of the lateral rotation 102 allowed by the hind leg pivot joints 103, 105 and the lateral movement 104 and backward and forward rotation 106 allowed by the hind leg anchor sleeves 101, and the resistive force imposed by the leg springs 61, 62, 63, simulate the anatomical movement and resistive forces of the legs that is desirable to simulate the leg handling required for the leg tying task that must be accomplished by the roper after the calf is inverted.

Referring again to FIG. 4 and FIG. 11, a structure and leg assembly substantially identical to that used for the hind legs may be used for preferred embodiments of the front legs. The front leg joint assemblies provide for the attachment of the front legs to the body frame in respective front leg anatomical positions. Alternatively, since only one of the front legs is involved in the leg tying task which completes the calf roping event, the left front leg may be omitted or a rigid left front leg 111 as shown in FIG. 4 may be affixed to the body frame 17. As shown in FIG. 3 and FIG. 4, a pair of hind leg springs 61, 62 and a right front leg spring 63 maintain the simulated calf legs in a neutral position 64 as the calf is being roped, spun, and inverted, and provide the needed simulated resistive force as the right front leg and the two hind legs are pulled together by the roper for the final leg tying task.

Referring again to FIG. 11, a vertical detail of an embodiment of a leg joint assembly that may be used for the two hind legs and for the right front leg is shown. As discussed previously, the leg anchor sleeve 101 provides for the lateral sliding 104 of the leg upon the leg anchor member 95 as shown in FIG. 8. The use of a double lateral hinge leg assembly 119 having an upper hind leg pivot joint 103 and a lower hind leg pivot joint 105, each of which provide for the lateral rotation 102 of the leg assembly along with the lateral movement 104 of the leg and the forward and rearward rotation 106 of the leg provided by the anchor sleeve 101 and the anchor member 95, have been found by the inventor to be preferable to the use of a single leg hinge. The double lateral hinge assembly, together with the anchor sleeve, more closely approximates the anatomical movement of each leg, as the legs are forced to the tying position required by the final leg tying task of the calf roping event. The leg anchor element 109 may incorporate a leg anchor bolt 125 which may be affixed to the leg assembly and provide for the leg to be screwed onto the leg assembly through the use of a leg anchor nut 127 welded to a leg insert 129.

Referring again to FIG. 10, a vertical side view detail of a preferred embodiment of the support column 5 is shown. FIG. 9 also shows a rear view detail of the support column 5, the body frame 17, including the main frame member 99, and the right hind leg assembly 55 and the left hind leg assembly 56. The spin joint 9 and the invert joint 11 are shown. The invert joint has an invert insert 147 which may be affixed in the vertical column member 171 of the body frame 17 by an insert anchor screw 173. For the preferred embodiment shown, the vertical column member is tubular with a square or rectangular cross section and the invert insert 147 has a corresponding square or rectangular cross section. For the embodiment shown, the invert receiver 149 is also a square or rectangular tube dimensioned to match the invert insert but allow a insert gap 174 between the invert insert and the invert receiver when the invert insert is inserted in the invert receiver. The invert receiver 149 may be affixed to the sleeve top stem 172 by a stem anchor bolt 178. This allows removal and repair or replacement of the invert receiver. The sleeve top stem may be welded to the sleeve top 177 of the spin sleeve 152 and spins with the simulated calf as it spins from the forward configuration 2 shown in FIGS. 1, 3, and 6 to the rearward configuration 4 shown in FIGS. 2, 4, and 7. The insert gap 174 is limited to provide for firm contact between the invert insert 147 and the invert receiver 149, and to facilitate the insert tube bottom 273 remaining in contact with and resting upon the receiver top 271, as the simulated calf is spun.

FIGS. 16, 17, 18 and 19 are detail drawings of the invert insert 147. The invert insert has an insert collar 179 adjacent to the insert crown 181, the horizontal cross-section dimensions of the insert collar 179 being only slightly smaller than the corresponding internal dimensions of the invert receiver, thereby providing for the invert insert to remain locked with the invert receiver as mostly lateral forces are imposed on the calf body by the rope as the calf body is spun from the forward configuration 2 to the rearward configuration 4. This lock between the invert insert and the invert receiver will be maintained whether the simulated calf spins to the left as is usually desired by the roper, or to the right if the calf is not running directly away from the roper at the time that the calf is roped. If, however, the calf is roped incorrectly or the calf is orientated directly away from the force of the rope, and as a result the calf is jerked directly rearward and therefore comes over backwards rather than being spun to the left or the right, the limited collar depth 275 of the insert collar 179 and the insert gap 174 between the invert insert and the invert receiver will allow the separation of the invert insert and the invert receiver in this scenario and allow the calf body to rotate directly up and backwards thereby allowing a natural result from an incorrect roping effort by the roper or an unfortunate orientation of the calf.

If the calf is rotated from the forward configuration to the rearward configuration successfully as a result of a proper execution of the roping task by the roper and the roper approaches the calf on foot, grasping the hondo with his left hand and the calf's right hind flank with his right hand and lifts the calf as would be required to lift a live calf off its feet, the invert insert 147 is lifted in the invert receiver 149 above the insert collar 179, and the insert front tapered zone 183 then allows for the front of the calf to be rotated up somewhat and the insert right tapered zone 185 allows for the invert insert 147 to separate from the invert receiver 149 and for the right side of the calf to rotated up approximately ninety (90) degrees so that the legs of the calf are extended more or less horizontally away from the roper, all for a motion correct inversion of the calf. The lifting and inverting of the simulated calf body can therefore be accomplished in a naturally simulated fashion, allowing the roper to lower the calf to the ground with the legs oriented away from the roper. The tying of the legs can then likewise be accomplished in a naturally simulated fashion, finishing the roping, inversion, and leg tying tasks of the calf roping event. An insert anchor bolt 173 may be used to provide for removal and repair or replacement of the invert insert 147.

Figure 12:
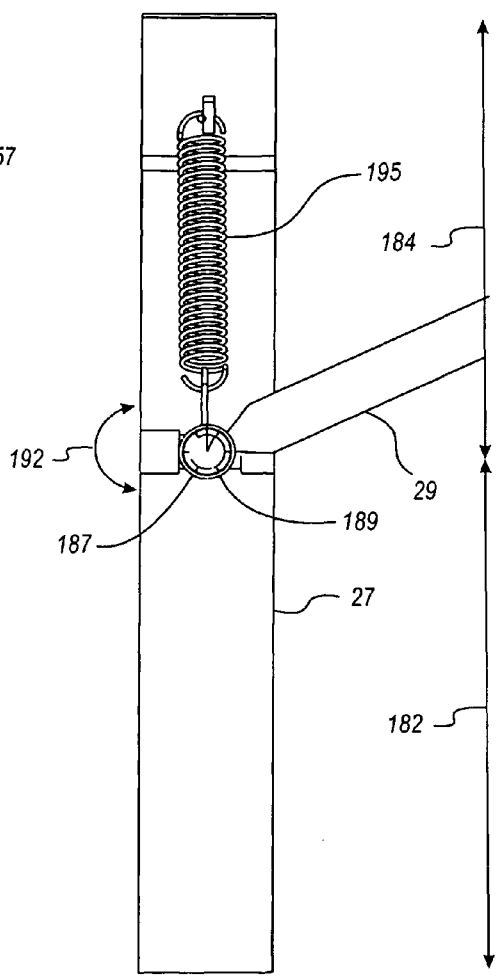
FIG. 12 is a plan view detail of a preferred embodiment of the long skid detail of the calf roping training apparatus of the present invention.
Figures 13, 14, 15:
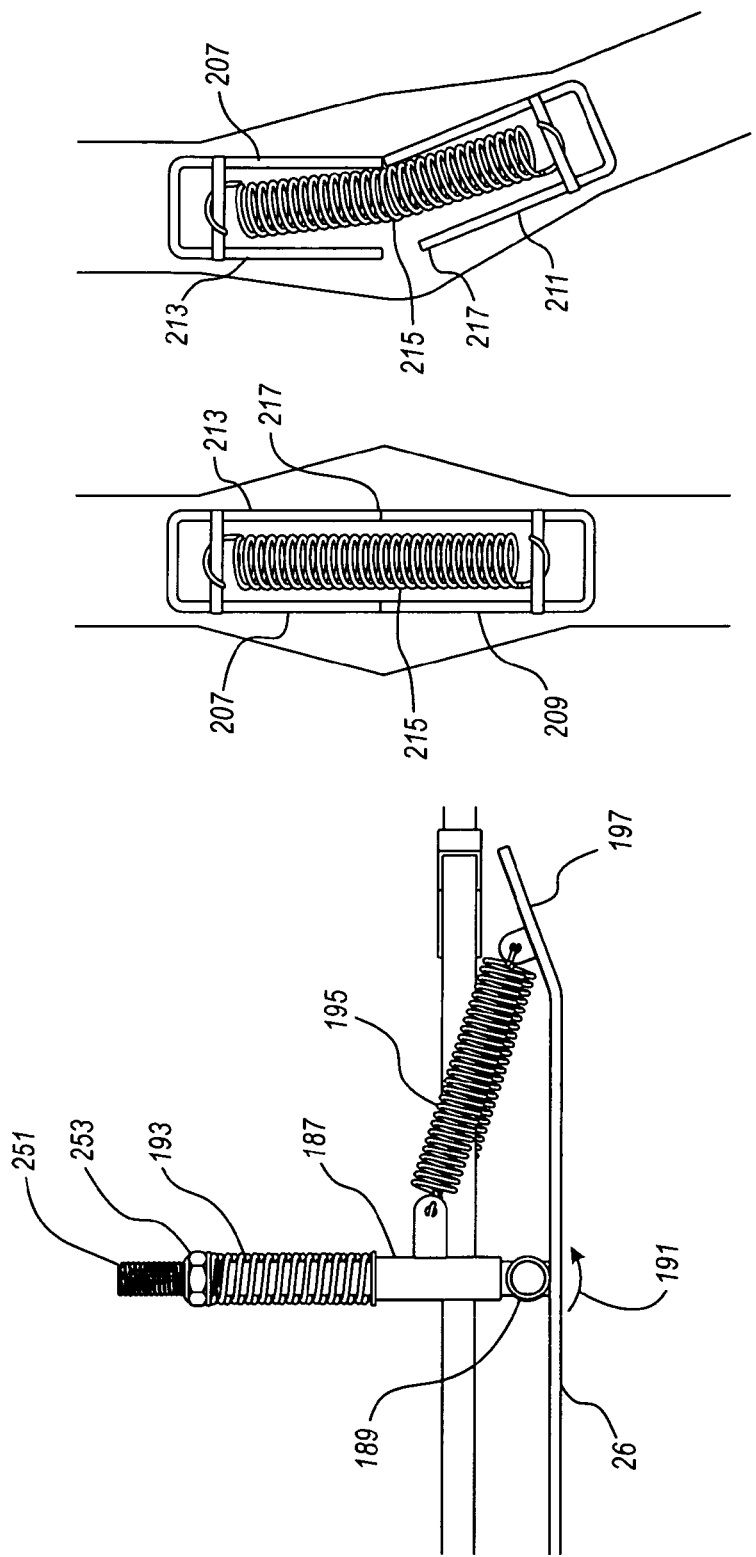
FIG. 13 is a vertical view detail of a preferred embodiment of the long skid of the calf roping training apparatus of the present invention.
FIG. 14 is a cut-away detail of a hock joint of the present invention in a non-flexed configuration.
FIG. 15 is a cut-away detail of a hock joint of the present invention in a flexed configuration.
Figure 16:
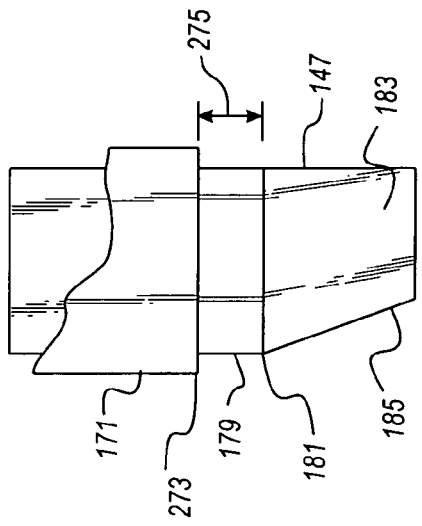
FIG. 16 is a vertical detail of an invert insert of the present invention.
Figure 17:
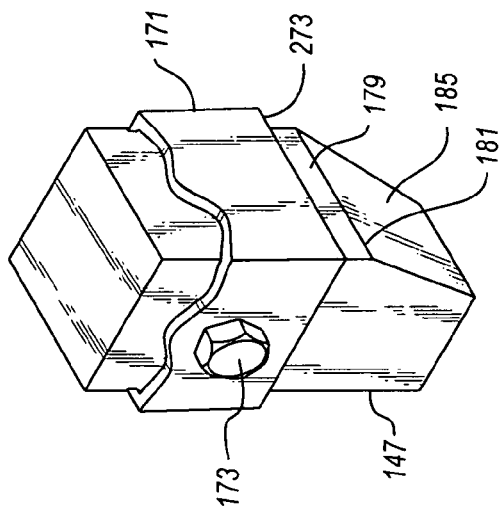
FIG. 17 is a vertical detail of an invert insert of the present invention.
Figure 18:
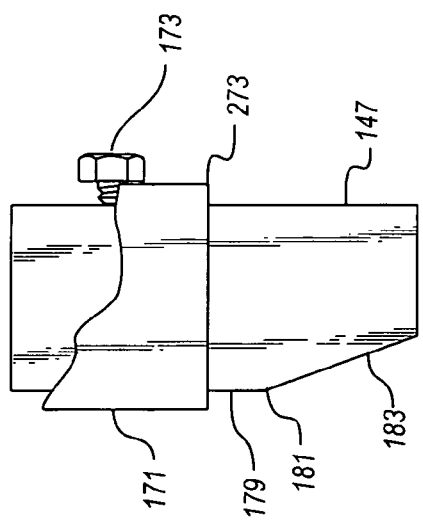
FIG. 18 is a vertical detail of an invert insert of the present invention.
Figure 19:
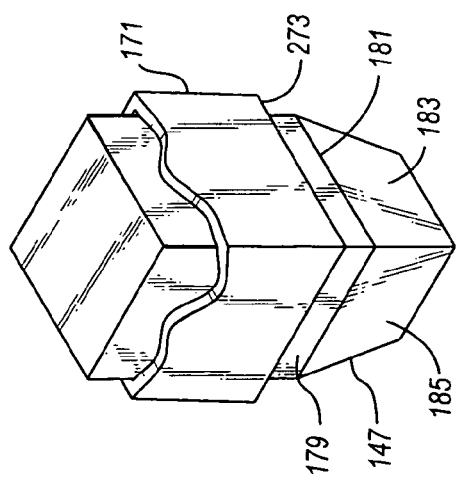
FIG. 19 is a vertical detail of an invert insert of the present invention.

Referring again to FIG. 5, a preferred embodiment of the towing structure 7 is shown. For the embodiment shown, the transverse skid members 29 are swept back somewhat from the tow member 25, forming a transverse skid angle 186 of more than ninety degrees (90°). The transverse skid members may be connected to the tow member by a sleeve type tow member connector 31 or other connector which will be known to persons skilled in the art. Referring also to FIG. 13, a vertical side view detail of a preferred long skid mount assembly 187 for the long skids 26 of the towing structure is shown. Referring also to FIG. 12, each skid mount assembly may be connected to the transverse skid member 29 by a skid pivot joint 189 which provides for the longitudinal tilting 191 of the long skids 26 to conform to ground surface conditions as the towing structure is towed across the ground surface, and horizontal rotation 192 to allow the longs skids to track direction changes of the towing device. A significantly longer rear skid arm dimension 182 than the front skid arm dimension 184 insures that the long skids will track the direction of movement of the towing structure. A vertical compression spring assembly 193 extends upwardly from the skid pivot joint 189. A longitudinal spring assembly 195 extends from the skid tip 197 to the vertical compression spring assembly 193. The longitudinal spring assembly and the vertical spring assembly long skid provide for the flexible but stable tilting and rotation of the long skid. The vertical assembly compression nut 253 may be tightened or loosened on the vertical assembly shaft 251 to adjust the resistance to lateral rotation of the long skids. Other embodiments of the skid mount assembly will be known to persons of ordinary skill in the art. Simplified embodiments may merely provide for the long skids to be fixed non-pivotally to the transverse skid members. Also, variations in the support structure, including the use of wheels rather than skids, will be known to persons of ordinary skill in the art.

Referring to FIG. 10, the support column 5 may incorporate a support column spring assembly 199 with a support column spring 200 which extends between a bottom spring anchor 202, which is affixed to the short skid 27, and a top spring anchor 204, which is affixed to the sleeve top 177. The support column spring assembly 199 urges the spin sleeve 152 downwardly to prevent the spin sleeve from sliding upwardly on the spin shaft 151 or sliding off the spin shaft as the simulated calf is subjected to impact loads from towing, from the lariat of the roper, or from the roper and as the roper lifts and inverts the simulated calf body.

Figure 22:
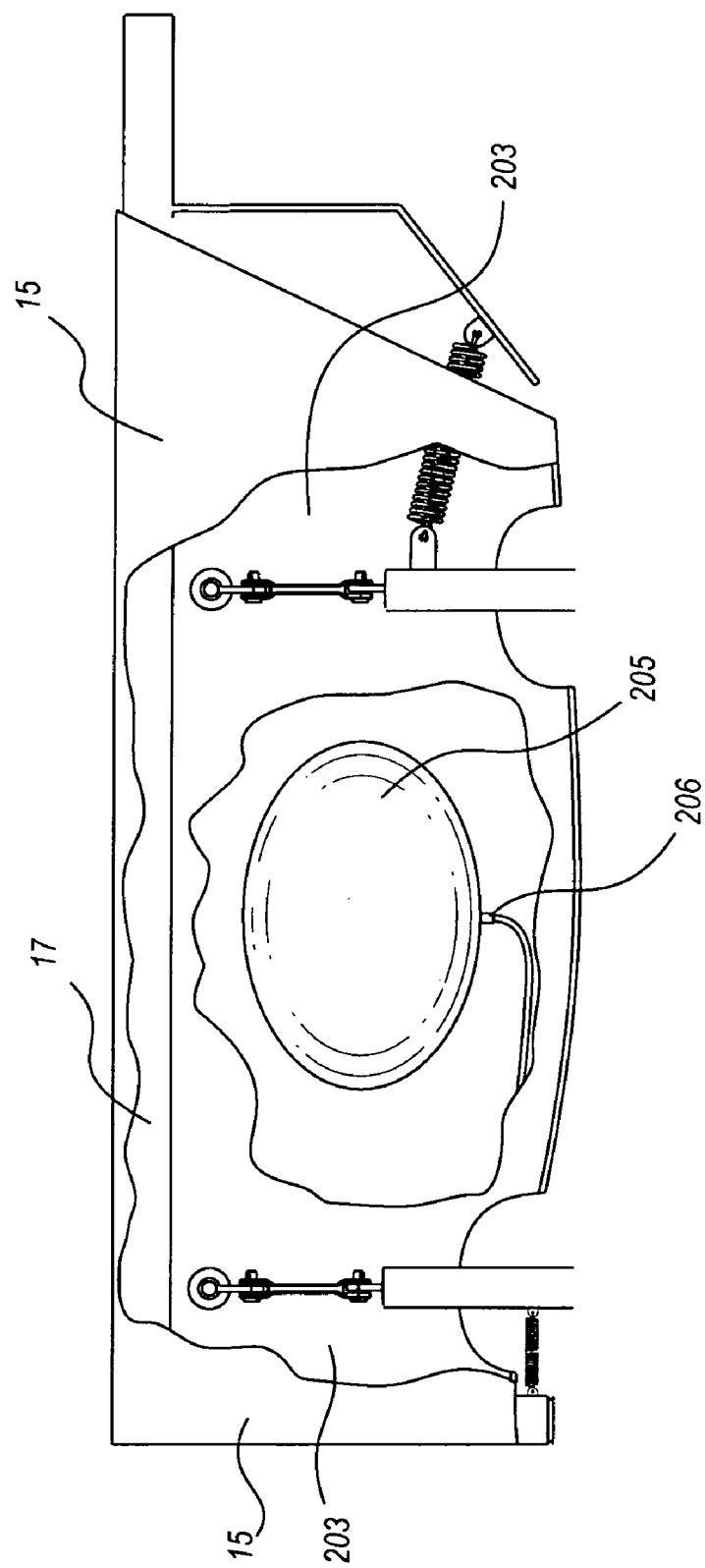
FIG. 22 is a vertical cut-away detail of an optional ballast bladder installation of the present invention.

Referring again to FIG. 8, the simulated calf 3 has a layer of simulated skin 15 and a simulated head 16 defining the exterior of simulated of the simulated calf body 13. The simulated calf body may also have an internal ballast cavity membrane 203 which may enclose and support an optional ballast bladder 205 as shown in FIG. 22. The ballast cavity membrane will preferably be a resilient membrane that accommodates the inflation and deflation of the ballast bladder. The ballast bladder may be inflated with air, adding bulk to the simulated calf body 13, or may be inflated or partially inflated with water, adding weight to the simulated calf body. A fill valve 206 preferably located on the bottom of the ballast bladder, may be used to add or remove air or water or both. The addition of air or water or a combination of air and water to the ballast bladder may be used to simulate a calf who has recently eaten before a roping event. Varying the bulk and weight of the simulated calf allows the roper to vary the target calf characteristics, another highly desirable practice tool.

Referring to FIG. 14 and FIG. 15, a simulated hock joint assembly 207 that may be incorporated in the hind legs 139, 141 of the simulated calf is shown. FIG. 14 shows the hock joint assembly in a non-flexed configuration 209 and FIG. 15 shows the hock joint in a flexed configuration 211. A hock joint frame 213 has a separation joint 217 which allows the flexing of the joint during the leg tying task. A hock joint spring 215 provides simulated resistance to joint flexing and restores the joint to the non-flexed configuration after the tying task is concluded and the legs are released.

Figure 21:
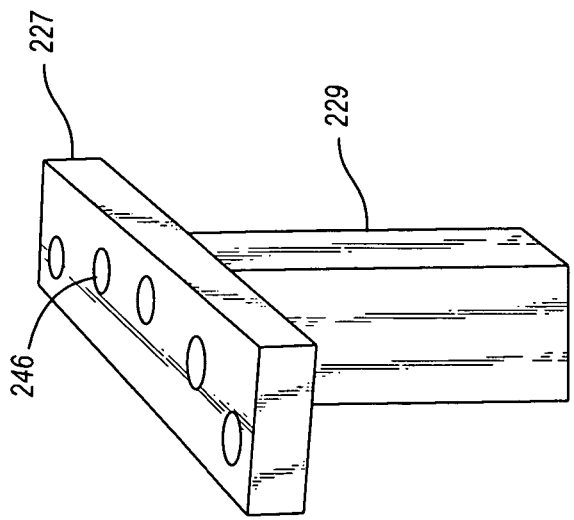
FIG. 21 is a perspective detail of a selector seat of an optional orientation selector assembly of the present invention.

Referring again to FIG. 10, an orientation assembly 221 may be incorporated with the spin joint 9. The orientation assembly 221 has a selector pin assembly 231, which has a selector pin 229 that is spring loaded by a pin spring 233 to urge the pin head 225 against the selector seat 227 which is attached to the top of the selector pedestal 229. The selector pedestal extends upwardly from and is affixed to the tow member 25. The selector pin assembly 231 is affixed to the spin sleeve 152 by a pin assembly plate 223 and spins with the spin sleeve. Referring also to FIG. 21, a number of positioning recesses 246 in the selector seat 227 allow the selector pin to be seated in various angular positions, thereby allowing the simulated calf to be rotated to the left or the right and providing a variation in the orientation of the simulated calf as the simulated calf is towed for roping practice.

Figure 20:
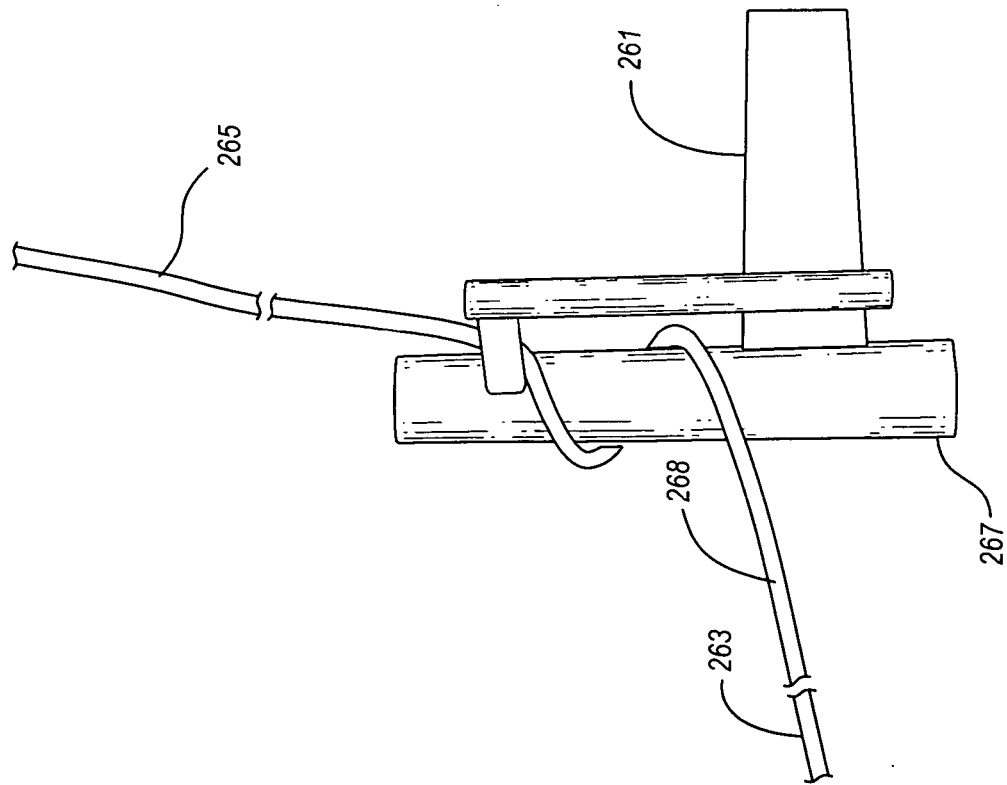
FIG. 20 is a vertical detail of a preferred embodiment of a towing anchor device of the present invention.

Referring to FIG. 20 a front perspective detail of a preferred rope friction type towing anchor device 267 is shown. The towing anchor device is affixed to the towing device by a towing attachment member 261, which may be a standard hitch insert tube or other means known to persons skilled in the art. A tow rope 268 may be grasped on its free end 265 by the towing device operator, and the tow end 263 may be secured to the tow member 25 at the tow attachment device 38. The towing anchor device imposes a friction force on the tow rope, allowing the towing device to tow the calf roping training apparatus 1. If an unexpected impact force is sensed by the towing device operator, the towing device operator can release the tow rope, allowing the tow rope to slip through the tow anchor device, thereby releasing the calf roping training apparatus. If a towing anchor device 267 such as that shown in FIG. 20, is used to connect the towing structure to the towing device, the towing attachment device 38 may be any device or fixture that allows a tow rope to be tied or otherwise connected to the towing structure. Similarly, if the towing structure is to be connected to the towing device by a tow rope, cable, chain or the like, in any manner, the towing attachment device 38 may be any device or fixture that allows the tow rope, cable, chain or the like, to be tied, hooked or otherwise connected to the towing structure.

Other embodiments and variations of the body frame to support the calf body, including the head and skin, to attach the legs to the calf body in an anatomical position, and to attach the calf body to the support column, will be known by persons skilled in the art, in view of the disclosures of the present invention.

Other embodiments and variations of the leg joint assemblies providing for simulating the movement and resistive forces of the two hind legs and the right front leg of a calf experienced by a roper during the leg tying task will be known by persons skilled in the art, in view of the disclosures of the present invention.

Other embodiments and variations of the towing structure providing for anchoring and stabilizing the support column, attaching the calf roping training apparatus to a towing device, and providing for towing the calf roping training apparatus at a desired speed and along a desired course, will be known by persons skilled in the art, in view of the disclosures of the present invention.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. A calf roping training apparatus for use by a roper, the calf roping training apparatus comprising:
   simulated calf body having a body frame;
   pair of simulated hind legs, comprising a right hind leg and a left hind leg, the hind legs being pivotally attached to the body frame in respective hind leg anatomical positions;
   simulated right front leg pivotally attached to the body frame in a right front leg anatomical position;
   support column attached to or integrated with the body frame and extending downwardly from the body frame, the support column comprising a spin joint and an invert joint, the spin joint comprising a spin shaft, a spin sleeve having a spin track, and a spin ramp, and the invert joint comprising an invert receiver and an invert insert; and
   towing structure, the support column being attached to and extending upwardly from the towing structure.

2. The calf roping training apparatus of claim 1 wherein the spin track has a flattened track tip and the spin ramp has a flattened ramp seat.

3. The calf roping training apparatus of claim 1 further comprising a simulated left front leg and a left front leg joint assembly attached to the body frame.

4. The calf roping training apparatus of claim 1 further comprising a rigid left front leg attached to the body frame.

5. The calf roping training apparatus of claim 1 wherein the calf body has a layer of simulated skin defining the exterior of the simulated calf body.

6. The calf roping training apparatus of claim 1 wherein the calf body has an internal ballast cavity membrane and a ballast bladder.

7. The calf roping training apparatus of claim 1 wherein the towing structure comprises a towing attachment device, a tow member, a pair of transverse members affixed to the tow member, a pair of long skids, and a short skid.

8. A calf roping training apparatus for use by a roper, the calf roping training apparatus comprising:
   simulated calf body, comprising a body frame, simulated head, and simulated skin;
   pair of simulated hind legs comprising a right hind leg and a left hind leg;
   pair of hind leg joint assemblies, comprising a right hind leg joint assembly and a left hind leg joint assembly, the hind leg joint assemblies attaching the hind legs to the body frame in respective hind leg anatomical positions and providing for simulating anatomically correct movement of the simulated hind legs from a hind leg neutral position to a tying configuration;

simulated right front leg;

right front leg joint assembly attaching the right front leg to the body frame in a right front leg anatomical position and providing for simulating anatomically correct movement of the simulated right front leg from a front leg neutral position to the tying configuration;

support column attached to or integrated with the body frame and extending downwardly from the body frame, the support column comprising a spin joint and an invert joint, the spin joint comprising a spin shaft, a spin sleeve having a spin track, and a spin ramp, and the invert joint comprising an invert receiver and an invert insert; and towing structure, the support column being attached to and extending upwardly from the towing structure.

9. The calf roping training apparatus of claim 8 wherein the spin track has a flattened track tip and the spin ramp has a flattened ramp seat.

10. The calf roping training apparatus of claim 8 further comprising a simulated left front leg and a left front leg joint assembly attached to the body frame.

11. The calf roping training apparatus of claim 8 further comprising a rigid left front leg attached to the body frame.

12. The calf roping training apparatus of claim 8 wherein the calf body has a layer of simulated skin defining the exterior of simulated of the simulated calf body.

13. The calf roping training apparatus of claim 8 wherein the calf body has an internal ballast cavity membrane and a ballast bladder.

14. The calf roping training apparatus of claim 8 wherein the towing structure comprises a towing attachment device, a tow member, a pair of transverse members affixed to the tow member, a pair of long skids, and a short skid.

\* \* \* \* \*